April 16, 1929.  A. Y. DODGE  1,709,250
BRAKE OIL GUARD
Filed Nov. 28, 1924  2 Sheets-Sheet 1
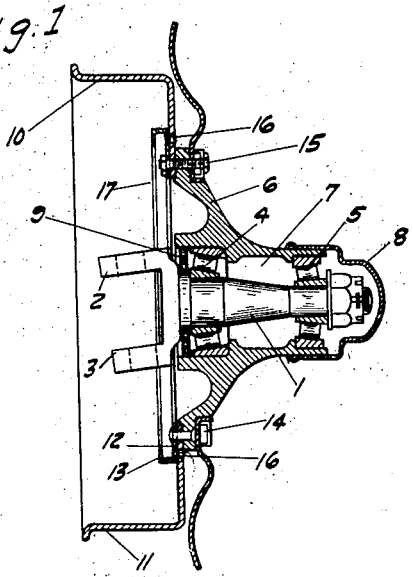
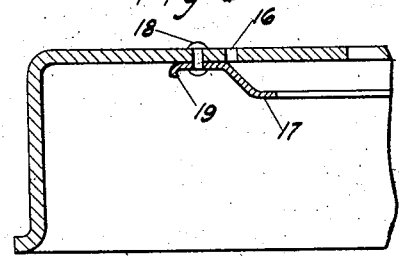
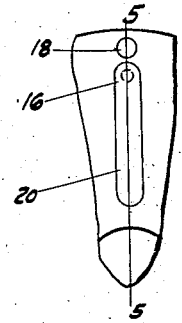
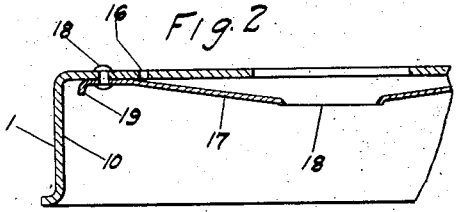
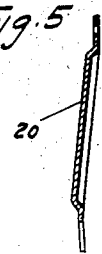
INVENTOR
ADIEL Y. DODGE
BY
ATTORNEY

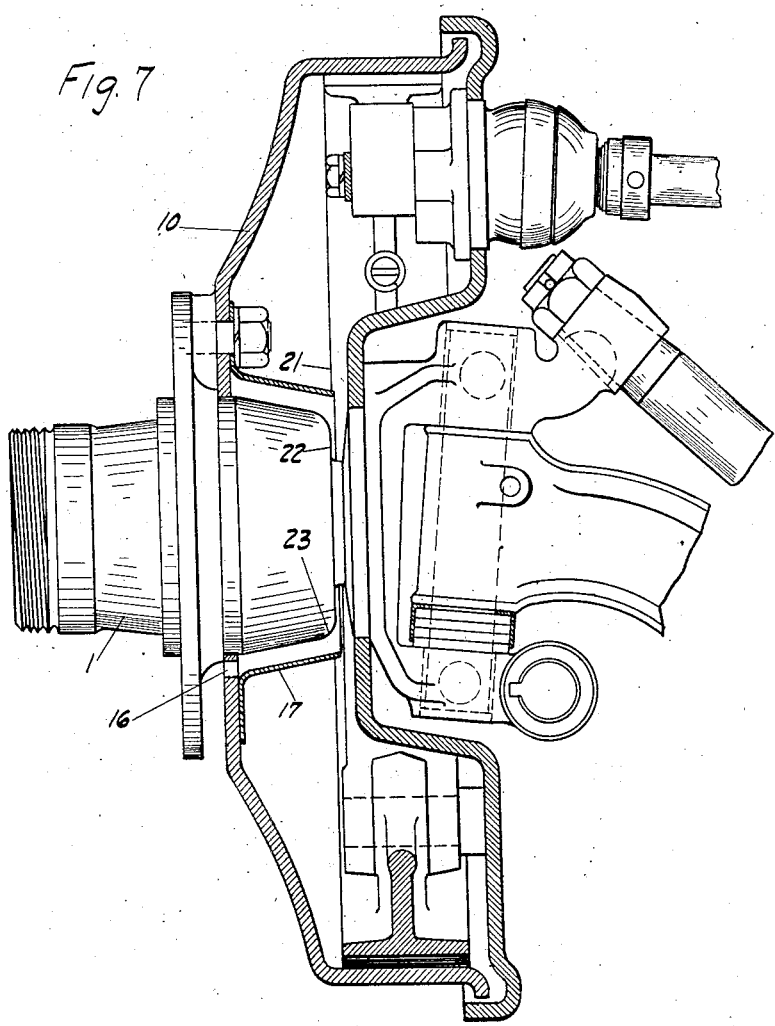

Patented Apr. 16, 1929.

1,709,250

UNITED STATES PATENT OFFICE.

ADIEL Y. DODGE, OF SOUTH BEND, INDIANA, ASSIGNOR TO BENDIX BRAKE COMPANY, OF CHICAGO, ILLINOIS, A CORPORATION OF ILLINOIS.

BRAKE OIL GUARD.

Application filed November 28, 1924. Serial No. 752,567.

The object of this invention is to provide means for preventing lubricant, used for lubricating the wheel bearings of a vehicle, such as an automobile, from reaching the braking surfaces, comprising the inner surface of the flange of the drum and the brake shoes. Numerous devices, such as felt washers, have been and are in use at the present time to prevent the lubricant from creeping out of the wheel hubs along the head wall of the brake drum and reaching the said braking surfaces through the effect of centrifugal gravity forces. It is clearly understood that when this lubricant reaches the braking surfaces, particularly, in any quantity, the braking effect will be greatly reduced with obvious results.

It is the object of my invention to provide positive means, of a very simple nature, for preventing lubricant from reaching the braking surfaces.

My invention will best be understood by reference to the following specification, taken in connection with the annexed drawing, wherein Figure 1 is a sectional view on a much reduced scale showing a conventional form of front wheel vehicle hub with its bearings, and attached to the hub a portion of the disc wheel. The brake drum and oil guard being shown attached to the hub and wheel.

Figure 2 is a sectional view of a conventional brake drum and an alternative form of oil guard assembled thereto.

Figure 3 is a further alternative form of oil guard.

Figure 4 is a fragmentary view showing how the oil guard, illustrated in Fig. 2, may be formed at the point where it is fastened to the drum.

Figure 5 is a section on the line 5—5 of Fig. 4 while

Figure 6 shows a further modified form of making the oil guard.

Figure 7 is a sectional view showing a portion of a standard form of vehicle front wheel, illustrating the application of one form of oil guard.

Referring now to the details wherein like numbers refer to corresponding parts in their various views, 1 is a wheel spindle having portions 2 and 3 for mounting on the vehicle axle. Carried on the spindle 1 by bearings 4 and 5, is a wheel hub 6 and as usual practice, the cavity 7 is packed with grease, and in order to assist in holding the grease within the cavity 7, a hub cap 8 and a packing washer 9 is used. Even though considerable care be given to the manufacture and installation of the packing washer 9, or its equivalent, more or less lubricant gets out of the chamber 7, particularly, in hot weather, then, this lubricant is thrown onto the braking surface 10 by the brake drum 11 and onto the brake shoes, which are not shown. To divert this lubricant from the braking surfaces, I have provided an annular member or oil guard 17 which, as shown in Fig. 1, consists of a light sheet metal stamping made up in the shape of a channel in which flange 12 is wider than the flange 13. The flange 12 is fastened to the drum 1 and hub 6 in any satisfactory manner as by rivets 14 or bolts 15. Other means of fastening the oil guard to the drum will be later referred to. The flange 12 has a series of holes 16 therethrough about on a line with the web of the oil guard, so as to get the maximum effect of centrifugal force to drive the lubricant out through the holes 16. These holes are in alignment with corresponding holes through the drum 11 so that as the lubricant is caught by the channel shaped guard it is forced through the holes 16 to the points exterior of the drum.

In Fig. 2, the oil guard 17 is circular in form, the same as in Fig. 1, and has a central opening for the wheel spindle. Near its outer periphery, the oil guard is shown as riveted by a series of rivets 18 to the drum 1. It is to be understood that other means may be provided for fastening the oil guard 17 to the drum 1, such as spot or line welding. In this construction holes 16 are placed near the point of attachment of the member 17, to the drum 1. When rivets or their equivalent are used for fastening the oil guard to the drum, it is to be understood that sufficient number are used so as to prevent any leak of the oil past the line of attachment, it being understood that paint or the like may be used to assist in making the joint between the guard and drum, oil tight.

In Fig. 3 the oil guard is shown somewhat in the shape of a dish. In both Figs. 2 and 3 the edge 19 of the oil guard 17 may be turned over in order to stiffen the edge thereby assisting in getting an oil tight joint where the oil guard 17 is attached to the drum. It is to be understood that the holes 16, in each construction shown, are so positioned as to clear all obstructions so as to insure the carrying away of the lubricant. The member 17, as shown in Fig. 2, may have the metal, adjacent the hole 16, punched outward, as indicated at 20 in Figs. 4 and 5, to provide recesses for collecting the lubricant and to assist in feeding the lubricant to the holes 16.

In Fig. 6 a section of the oil guard is somewhat triangular in shape, but these various modifications merely indicate how the details for carrying my invention into practise may be varied; consequently, I do not wish to be unduly limited in the interpretation thereof.

In Fig. 7 a drum 10 is carried on the wheel spindle 1 and the oil guard 17, is similar to that shown in Fig. 2, except the cone of the guard has a greater angle and preferably, the plane 21 of the end of the cone extends beyond the plane 22 of the hub; the portion 23 having a curvature as large as possible to insure the diversion of the lubricant by the guard 17 through the holes 16.

Having thus described my invention what I claim is:

1. In a vehicle wheel equipped with a brake drum to be engaged by brake members, means for diverting lubricant from the braking surfaces of the drum and brake members comprising; a plate, preferably circular in shape, having a central spindle opening and being fastened near its periphery to the drum, said drum having holes therein near the line of attachment of the plate to the drum, while said plate is so formed as to catch lubricant leaking into the drum and carry it to the said holes therein.

2. In a vehicle wheel equipped with a brake drum to be engaged by brake members, means for diverting lubricant from the braking surfaces of the drum and brake members comprising; a plate, preferably circular in shape, having a central spindle opening and being fastened near its periphery to the drum, said drum having holes therein near the line of attachment of the plate to the drum, said plate having a portion formed away from the drum so as to catch lubricant leaking from the wheel bearings.

3. In a vehicle wheel equipped with a brake drum to be engaged by brake members, means for diverting lubricant from the braking surfaces of the drum and brake members comprising; a plate, preferably circular in shape, having a central spindle opening and being fastened near its periphery to the drum, said drum having holes therein near the line of attachment of the plate to the drum, said plate having its edge turned over on a line more distant from the center of the wheel than said line of attachment so as to stiffen the plate and to insure the catching of lubricant leaking into the drum and for carrying it to said drain holes in the drum.

4. In a vehicle wheel equipped with a brake drum to be engaged by brake members, means for diverting lubricant from the braking surfaces of the drum and brake members comprising in said drum, a series of holes preferably spaced equidistant from the center of the wheel and a plate preferably circular formed and fastened to the drum in such a manner as to catch lubricant leaking into the drum and divert it to said series of holes.

5. In a vehicle wheel equipped with a brake drum to be engaged by brake members, means for diverting lubricant from the braking surfaces of the drum and brake members comprising a circular stamped metal member channel shaped in cross section, one flange of the channel being wider than the other and fastened to the wheel and drum, said channel shaped member having a series of holes through the wide flange just above the web of the member while said drum has a series of holes in alignment with the holes in the channel member.

6. A wheel having a brake drum, in combination with a guard for conveying lubricant outside of the drum, and common means for securing the guard to the drum and the drum to the wheel.

7. A wheel having a brake drum, in combination with a guard for conveying lubricant outside of the drum and common fastenings passing through the guard and drum and securing them together and securing them both to the wheel.

8. A wheel having a brake drum, in combination with a lubricant guard carried by the drum and formed with discharge openings and radial grooves to direct the lubricant to the openings.

In testimony whereof I affix my signature.

ADIEL Y. DODGE.